UNITED STATES PATENT OFFICE.

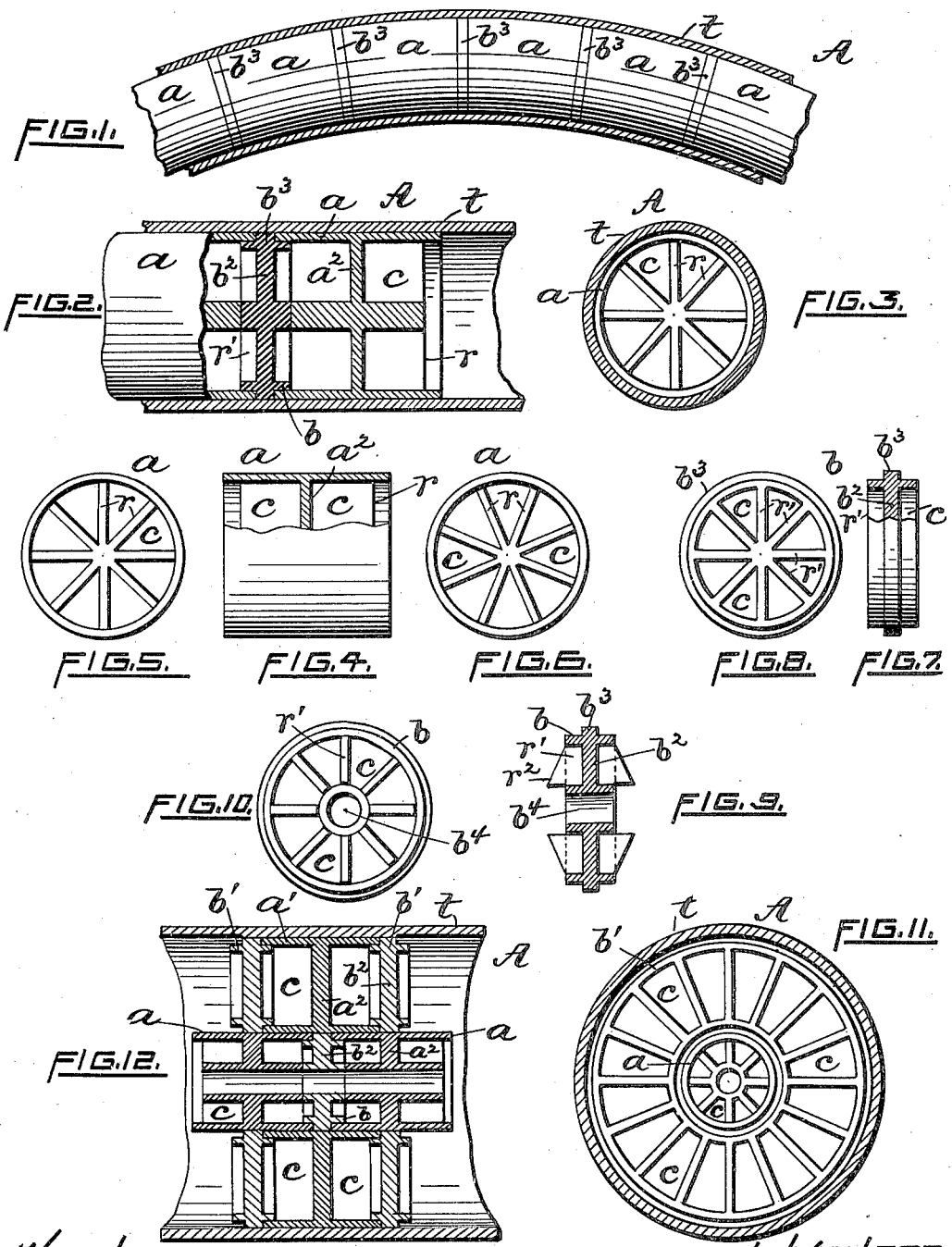

WILLIAM E. HOYLE, OF PROVIDENCE, RHODE ISLAND, ASSIGNOR TO RUDOLPH F. MORSE AND SAMUEL H. BOARDMAN, OF SAME PLACE.

PNEUMATIC TIRE.

SPECIFICATION forming part of Letters Patent No. 680,776, dated August 20, 1901.

Application filed December 8, 1900. Serial No. 39,119. (No model.)

*To all whom it may concern:*

Be it known that I, WILLIAM E. HOYLE, a citizen of the United States of America, and a resident of Providence, in the county of Providence and State of Rhode Island, have invented certain new and useful Improvements in Pnuematic Tires, of which the following is a specification.

My invention relates to improvements in pneumatic or air-cushioned tires for bicycle and other vehicle wheels; and it consists, essentially, of a series of cylindrical-shaped yielding compressible rubber sections in engagement with or connected to one another mounted within and filling the interior of a seamless rubber tube, said sections being provided with integral ribs and partitions arranged to form independent cells or pockets in which air under pressure may be confined and retained.

In pneumatic or inflatable tires as usually constructed, especially such as are of the single-tube type, it is well known that upon its being punctured the air freely escapes therefrom, thus rendering the tire unserviceable, or at least until it is repaired or a new one substituted therefor. In my improved tire the interior or chambered portion of the tube proper is provided with insertible resilient plugs or cylindrical-shaped sections which completely fill the same. Now as each plug or section member has a number of independent small cells or chambers therein it follows that the tire becomes practically non-puncturable as compared with the usual pneumatic tire, because its interior has a practically unlimited number of cells containing air under pressure, so that in case the tire should now be accidentally cut or punctured it will not become deflated or rendered unserviceable. This advantage is due to the fact that the several small cells containing air under pressure are wholly disconnected or independent of one another. Therefore a puncture will affect but a single cell, and as the latter bears such a small relation to the whole the tire will still retain its form and resiliency, and this advantage is retained even though quite a number of the cells should become punctured.

In the accompanying sheet of drawings, Figure 1 is a side elevation, in partial section, showing a portion of a pneumatic tire embodying my invention. Fig. 2 is an enlarged longitudinal sectional view showing the arrangement of the cellular cylindrical plugs or sections mounted within the rubber tube. Fig. 3 is an end view of the same. Fig. 4 is a side view, in partial section, of one of the sections detached from the tire. Figs. 5 and 6 are corresponding end views. Fig. 7 is a view similar to Fig. 4, showing one of the intermediate or thin disk-like sections detached. Fig. 8 is an end view. Fig. 9 is a cross-section of one of said intermediate or connecting sections, showing a modification. Fig. 10 is an end view of it. Fig. 11 is an end view showing my improved tire as adapted for heavy vehicle-wheels, and Fig. 12 is a longitudinal central sectional view of the same.

The following is a more detailed description of my improved pneumatic tire:

A designates the tire as a whole, the same comprising the seamless cover or tube $t$, of rubber, and the cylindrical-shaped compressible rubber sections or plugs $a$ and $b$, each provided with air cells or pockets and mounted within the tube $t$. As drawn, the rim portions of said section or core $a$ project a short distance at each end beyond the face of the several ribs or arms $r$, the latter being united at the center of the section and radiate therefrom to the rim. Each section is further provided with a transverse web or partition $a^2$, thereby in combination with said ribs forming on each side of the partition a series of open cells or pockets $c$. If desired, the ribs on one side of the cylinder may alternate with those on the other side, (see Figs. 4, 5, and 6,) thereby practically subdividing its peripheral distance between the cells, or, in other words, the cells $c$ in one side alternate with those of the opposite side or end. The member $a$ is made of rubber, the said rim, ribs, and partition $a^2$ thereof being integral. The other section or core member $b$, (see Figs. 7 and 8,) while narrower than the said cylinder $a$, is otherwise substantially the same as the latter. The center portion $b^3$ of its rim is adapted to bear snugly against the end of the rim of the fellow member $a$, the adjacent reduced side portions being inserted into the ends of the sections $a$, as shown in Fig. 2. The cores or disks $b$ are each provided with a transverse partition $b^2$ and radial arms $r'$, having between them shallow cells or pockets $c$, arranged to communicate with and forming the complement of the pockets $c$ of the section $a$.

The manner of inserting the sections into the tube or cover $t$ is substantially as follows: The tube is first slitted longitudinally along its under side. The core-sections $a$ and $b$ are then introduced successively through said slit until the tube-chamber is completely filled, at the same time cementing the adjacent meeting surfaces thereof and then compressing them snugly together endwise, thereby rendering the cells or pockets air-tight, the degree of air-pressure therein being due to the force employed in compressing the sections together. It will be found that the tube is slightly distended as a result of the filling operation. The said opening is next closed in any suitable way, as by cementing or lacing. The tire will now possess a practically permanent degree of resiliency, as hereinbefore stated.

The several sections or cores may be placed in the tube before being vulcanized and the whole then placed in the mold and vulcanized together, the resulting tire when removed from the mold being practically completed and ready for use.

In order to strengthen and stiffen the joint formed between the members $a$ and $b$, the arms or ribs $r'$ of the latter may be extended beyond the rim, as shown at $r^2$, Fig. 10, such extensions being adapted to be inserted in the pockets of the members $a$ and bear against the side of the corresponding ribs $r$. If desired, the hub portion may be provided with a central hole $b^4$. (See Figs. 9 and 10.)

In Figs. 11 and 12 I have represented my invention as arranged and adapted to pneumatic tires having a comparatively large diameter cross-sectionally. In this case I prefer to employ center sections $a$ and $b$, substantially as hereinbefore described, around which are mounted correspondingly-shaped annular but larger sections $a'$ $b'$, the whole being inserted into the tube $t$, as before stated. This tire, too, will possess a permanent degree of resiliency and is practically non-puncturable, since all the air cells or pockets $c$ are separated from one another by the surrounding walls or partitions.

While I do not claim, broadly, as my invention a pneumatic tire provided with one or more series of independent air pockets or cells, what I do claim, and desire to secure by United States Letters Patent, is—

1. A pneumatic or wheel tire, the same comprising a plain outer tube of rubber and a series of short cylindrical cellular sections of rubber mounted within and snugly filling said tube, the said sections having small independent air-tight cells or pockets therein, substantially as shown and described and for the purpose set forth.

2. The yielding tubular core-section $a$ hereinbefore described, provided interiorly with transverse and longitudinal partitions $a^2$, $r$, arranged to form air-spaces $c$, and having the ends of the rim extending beyond the partitions, substantially as described and for the purpose set forth.

3. In a resilient or pneumatic tire for vehicle-wheels, the combination with the rubber tube or cover $t$, of a series of connected rubber sections forming the center cores, each provided with independent air-pockets, and a corresponding series of enlarged annular connected rubber sections surrounding said center sections, also having independent air-pockets and mounted within said tube, substantially as described.

Signed by me at Providence, Rhode Island, this 30th day of November, A. D. 1900.

WILLIAM E. HOYLE.

Witnesses:
GEO. H. REMINGTON,
WILLIAM A. SULLIVAN.